United States Patent

Shimomura et al.

[11] Patent Number: 5,963,403
[45] Date of Patent: Oct. 5, 1999

[54] BELT DRIVEN TAPE CARTRIDGE

[75] Inventors: Osamu Shimomura; Hiroyuki Ikeda, both of Yokohama, Japan

[73] Assignee: Verbatim Corporation, Charlotte, N.C.

[21] Appl. No.: 08/957,071

[22] Filed: Oct. 24, 1997

[51] Int. Cl.⁶ .................................................. G11B 23/087
[52] U.S. Cl. ............................................................ 360/132
[58] Field of Search ........................ 360/132; 242/352.4

[56] References Cited

U.S. PATENT DOCUMENTS 5,577,681  11/1996  Sano et al. ............................. 360/132
5,722,610   3/1998  Smith et al. ......................... 242/352.4

*Primary Examiner*—Robert S. Tupper
*Attorney, Agent, or Firm*—Oblon, Spivak, McClelland, Maier & Neustadt, P.C.

[57] ABSTRACT

Disclosed is a belt driven tape cartridge capable of recording data at a higher density and a higher speed than in the conventional belt driven tape cartridges. The belt driven tape cartridge includes a flexible non-magnetic support, a magnetic recording layer formed on one surface of the flexible support and having a surface roughness of 10 nm or under, and a back coat layer formed on the other surface of the flexible support and having a surface roughness being above 100 nm but under 300 nm.

4 Claims, 1 Drawing Sheet

BELT DRIVEN TAPE CARTRIDGE

BACKGROUND OF THE INVENTION

1. Field of the Invention

The present invention relates to a belt driven tape cartridge for backing up data of, e.g., a computer, in which a magnetic recording tape is driven by a belt.

2. Description of the Related Art

Over the recent years, for backing up data used in a computer, there has been employed a tape cartridge in which a magnetic recording tape is driven by a belt (which cartridge is hereinafter be termed a "belt driven tape cartridge).

A construction and an operation of the belt driven tape cartridge will hereinafter be briefly described. Note that U.S. Pat. No. 3,692,255, U.S. Pat. No. 4,581,189, U.S. Pat. No. 4,262,860 and U.S. Pat. No. 4,466,564 should be referred to for greater details of the belt driven tape cartridge.

A typical belt driven tape cartridge has such a construction that a box body incorporates a pair of tape reel hubs for accommodating a magnetic recording tape, a belt for rotating the tape reel hubs (for running the magnetic recording tape), and belt drive rollers.

Normally, the box body is constructed of a baseplate composed of a metal such as aluminum and an upper half composed of plastic such as polycarbonate. A surface (hereinafter referred to as a front surface) of the upper half, which surface becomes an inserting side when inserted into a recorder, is formed with first and second openings into which a drive roller and a head of the recorder are respectively inserted when set in the recorder.

A belt drive roller is provided in the vicinity of the second opening of the baseplate. More specifically, the belt drive roller is disposed in such a position as to come into contact with the drive roller of the recorder when the belt driven tape cartridge is set in the drive. The pair of tape reel hubs are provided on the baseplate in such a form that the hubs can not be rotated directly from outside of the box body. Further, the baseplate is provided with members for determining a route for the magnetic recording tape so that the magnetic recording tape wound round one tape reel hub passes by in the vicinity of the first opening and reaches the other tape reel hub. Moreover, the baseplate is also provided with members for holding the belt so as to be always kept in pressure-contact with the belt drive roller and with the magnetic recording tape wound both of the tape reel hubs irrespective of quantities of the magnetic recording tape wound round the respective tape reel hubs.

That is, in the belt driven tape cartridge, a force enough to rewind the magnetic recording tape round the periphery of one tape reel hub at the same velocity as a velocity of the belt, is applied to the one tape reel hub. Further, a force enough to wind the magnetic recording tape round the periphery of the other tape reel hub at the same velocity as the belt velocity, is likewise applied to the other tape reel hub. Therefore, the belt driven tape cartridge is capable of abruptly accelerating and decelerating the magnetic recording tape.

The belt driven tape cartridge is used in such a state that a running speed of the magnetic recording tape is about 90 ips in order to utilize the above-described characteristics. In other words, the air is drawn between layers of the magnetic recording tape wound thereon.

When the air is drawn between the layers of the magnetic recording tape, there occurs a phenomenon called a winding deviation (a pack shift), wherein the magnetic recording can not be normally wound round the tape reel hubs. If this pack shift occurs, a relative positional relationship between the head and the magnetic recording tape becomes different every running process, with the result that a good quality record and reproduction can not be carried out.

It is well known that a roughening process on a surface (one or both of a magnetic recording layer and a back coat layer) of the magnetic recording tape is effective to prevent the occurrence of the pack shift. If the surface of the magnetic recording layer is excessively roughened, however, a spacing loss increases, and consequently a C/N deteriorates. Further, in the belt driven tape cartridge, a comparatively large pressure caused by the drive belt is applied to the magnetic recording tape wound round the tape reel hub, and hence, if the surface of the back coat layer is excessively roughened, there appears a phenomenon (known as print-through), wherein a surface configuration on the back coat layer of the magnetic recording tape laminated contiguously on the magnetic recording layer of the magnetic recording tape, is transferred on this magnetic recording layer.

Therefore, the surface of the magnetic recording tape has hitherto been roughened properly so that degrees of deterioration of the C/N, the print-through and the pack shift fall within allowable ranges.

On the other hand, it is required that the surface of the magnetic recording layer be more flattened and the running speed of the magnetic recording tape be made by far faster to obtain the belt driven tape cartridge capable of recording and reproducing the data at a high speed and a high density. When increasing the tape running speed, the air is more easily drawn in between the layers of the magnetic recording tap, and therefore the pack shift is easy to occur. Further, when the magnetic layer is flattened, the air drawn between the layers of the magnetic recording tape tends to remain therebetween, which also makes it easy to cause the pack shift. Under such conditions where the pack shift is easy to occur, the surface property of the magnetic recording tape is required to be controlled more precisely than by the prior arts in order to obtain the belt driven tape cartridge contrived to prevent the occurrence of the pack shift as well as to cause no print-through and to obtain an enhanced C/N.

SUMMARY OF THE INVENTION

Accordingly, it is a primary object of the present invention to provide a belt driven tape cartridge capable of recording data at a higher density and a higher speed than in the prior art belt driven tape cartridge.

To accomplish the above object, according to one aspect of the present invention, a belt driven tape cartridge is constructed by use of a magnetic recording tape including a flexible non-magnetic support, a magnetic recording layer formed on one surface of the flexible support and having a surface roughness of 10 nm or under, and a back coat layer formed on the other surface of the flexible support and having a surface roughness being not more than 100 nm but not less than 300 nm.

The belt driven tape cartridge using the magnetic recording tape exhibiting the above-described surface properties exhibits a good C/N without any influence of the surface property of the back coat layer upon the magnetic recording layer under severer environment than in the prior arts, and is usable in such a state of causing no pack shift. Therefore, when the present belt driven tape cartridge is employed, the data can be recorded at the higher density and the higher speed.

Moreover, a thickness of the flexible non-magnetic support can be set to 5 μm or under, and it is therefore feasible to actualize the belt driven tape cartridge capable of recording the data of a large capacity.

Note that on the occasion of manufacturing the magnetic recording tape for the belt driven tape cartridge according to the present invention, the magnetic recording layer, it is desirable, should contain a metal magnetic powder of which a saturation magnetization is 120 emu/g or above, a coercive force is 1600 Oe or above, and a specific surface area is 50 $m^2/g$ or above.

Further, the belt driven tape cartridge according to the present invention can be actualized in such a form that the distances of rotary spindles of the pair of tape reel hubs from the front surface of the box body are different.

BRIEF DESCRIPTION OF THE DRAWINGS

Other objects and advantages of the present invention will become apparent during the following discussion in conjunction with the accompanying drawing, in which.

DETAILED DESCRIPTION OF THE PREFERRED EMBODIMENT

Figure 1:
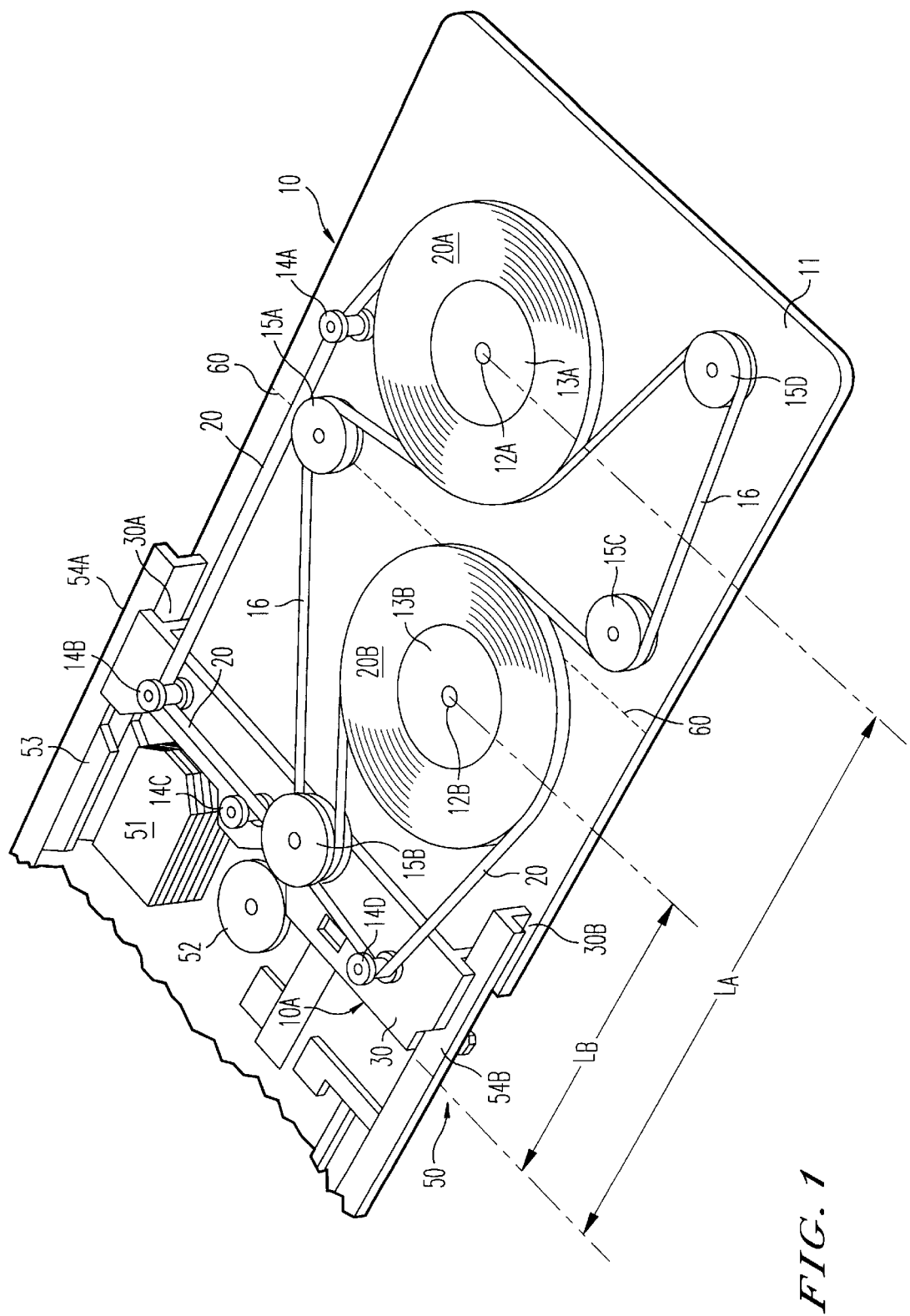
FIG. 1 is a perspective view illustrating a belt driven tape cartridge in an embodiment of the present invention.

The present invention will hereinafter be described in detail with reference to the accompanying drawing.

FIG. 1 illustrates a structure of a belt driven tape cartridge according to the present invention as well as a structure (of a principal portion) of a drive to which the belt driven tape cartridge is attached. Note that the present invention is characterized by a structure (surface properties) of the magnetic recording tape set in the tape cartridge, and the structure of the illustrated tape cartridge is already disclosed in, e.g., U.S. Pat. No. 4,262,860.

As shown in the FIG. 1, a belt driven tape cartridge 10 includes a baseplate 11, and a pair of tape reel hubs 13A, 13B for winding up and accommodating a magnetic recording tape 20. The baseplate 11 is composed of a metal such as aluminum, and the tape reel hubs 13A, 13B are secured so that the tape reel hubs 13A, 13B are perpendicular to the baseplate 11 and rotatable about spindles 12A, 12B provided in positions where distances LA, LB from a front surface 10A of the tape cartridge 10 are different from each other.

Further, the baseplate 11 is provided with tape support members 14A–14D each composed of a metal pin. Positions of the tape support members 14A–14D are, as shown in FIG. 1, determined so that a running path of the magnetic recording tape 20 wound round the tape reel hubs 13A, 13B passes near the front surface 10A.

Further, the baseplate 11 is provided with guide pins each composed of a metal and belt support members 15A–15D disposed along peripheries of these pins and composed of resinous rotary rolls, which serve to support a drive belt 16. As obvious from FIG. 1, the belt support members 15A–15D are disposed so that the drive belt 16 is allowed to come into pressure-contact with both of tape packs 20A and 20B even when the magnetic recording tape 20 is wound discretely round the pair of tape reel hubs 13 at whatever rate (even when diameters of the tape packs 20A, 20B are in whatever state).

Furthermore, among the belt support members 15A–15D, the support member 15B disposed in the vicinity of the front surface 10A of the magnetic tape cartridge 10 functions also as a roller for driving the drive belt 16 from outside. Namely, this belt support member 15B is provided at a position so as to come into contact with a drive roller 52 provided within a recorder 50 when the tape cartridge 10 is loaded into the recorder 50, and makes the drive belt 16 move at a velocity corresponding to a rotating velocity of a drive roller 53.

The drive belt 16 is manufactured in such a manner that an annular ring is punched out or cut out of a sheet of resin such as thermoplastic elastomer, then stretched out and twisted in a belt-shape. The formation of the drive belt 16 may involve the use of any kind of thermoplastic elastomer under condition that the thermoplastic elastomer is easy for being treated at a high temperature and large of stretchability, and exhibits a good durability under repetitive loading process and an excellent abrasion resistance. For example, there may be used copolymer such as polyether urethane, polyester urethane, polycarbonate urethane, polyester, polyether, styrene and butadiene. An electric conductivity pigment may be added to this drive belt 16 for an antistatic purpose.

A over (an upper half) 30 (a part of which is illustrated) constituting a box body of the belt driven tape cartridge 10 in combination with the baseplate 11, is composed of plastic and so constructed as to include a groove structures 30A, 30B formed on both sides thereof. The groove structures 30A, 30B, when the tape cartridge 10 is loaded into the recorder 50, engage with guide members 54A, 54B (some portions of which are shown) formed in L-shape in section at edge portions on both sides of the recorder 50, thus guiding the tape cartridge 10 into the recorder 50. On this occasion, the guide member 54A also functions, when not attached while being axially supported on the baseplate 11, as a member for opening a door 53 covering a portion with which a magnetic head 51 comes into contact. When the tape cartridge 10 is completely loaded into the recorder 50, the edge of the recorder 50 comes to a position indicated by the numeral 60.

Note that there are some belt driven tape cartridges in addition to the one illustrated herein, wherein the spindles of the pair of tape reel hubs are spaced at an equal distance from the front surface. The belt driven tape cartridge 10 is improved so as to be capable of accommodating a much longer magnetic recording tape.

Next, The magnetic recording tape used in the belt driven tape cartridge according to the present invention will be explained.

The magnetic recording tape according to the present invention includes a magnetic recording layer having a surface roughness of 10 nm or under on one surface of a flexible non-magnetic support, and a back coat layer having a surface roughness of 100–300 nm on the surface opposite to the surface formed with the magnetic recording layer.

The magnetic recording tape according to the present invention requests only the above-described construction, and there is no particular restriction in terms of materials of constituting the magnetic recording layer and the back coat layer, a manufacturing method thereof, and a material of a configuration of the flexible non-magnetic support.

For example, the magnetic recording layer is formed by coating the flexible non-magnetic support with a magnetic paint into which a magnetic powder, a binding agent and a solvent are mixed. On the other hand, the back coat layer is formed by coating the flexible non-magnetic support with a paint obtained by mixing, e.g., carbon black, a binding agent and a solvent.

For the formation of the magnetic recording layer (the magnetic coating), various magnetic powders such as iron oxide series magnetic powders, hexagonal magnetic powders and metal magnetic powders may be used. It is, however, preferable to use the magnetic powder exhibiting the following characteristics in order to enable the magnetic recording tape to record at a high density.

BET specific surface area: 20–70 m²/g, and more preferably, 50–70 m²/g

Saturation magnetization σs: 120 emu/g or more

Coercive force Hc: 1600 Oe or above

Average major axis length: 0.3 μm or above, and more preferably. 0.01–0.1 μm

Acicular axis ratio: 12 or under

A quantity of the magnetic powder contained in the magnetic paint is preferably set so that a content of the magnetic powder in the magnetic recording layer be set to 50%–90% by weight and particularly 65%–75% by weight. It is because if the content of the magnetic powder in the magnetic recording layer is less than 50% by weight, it follows that a magnetic recording tape on which the high-density recording can not be executed might be obtained, and whereas if larger than 90% by weight, it follows that a magnetic recording tape exhibiting a poor durability might be obtained.

It is preferable to use, as a binding agent (a binder resin), a resin exhibiting an excellent adhesion to the support and an excellent abrasion resistance, and having a glass transition point of −100° C. through +150° C. and a number average molecular weight on the order of 1000–150000. There are exemplified, as a binder resin, cellulose derivatives such as polyurethane resin, polyester resin, cellulose acetate butyrate, cellulose diacetate and nitrocellulose, vinyl chloride series resins such as vinyl chloride-vinyl acetate series copolymer, vinyl chloride-vinylidene chloride series copolymer and vinyl chloride-acrylic series copolymer, a variety of synthetic rubbers such as styrene-butadiene copolymer, epoxy resin, and phenoxy resin. Note that when adjusting the magnetic paint, one or two or more kinds of binder resins are used so that the content in the magnetic recording layer is 2%–50% by weight and more preferably 5%–25% by weight.

Further, for instance, low molecule polyisocyanate compounds having a plurality of isocyanate groups such as trimethylolpropane adduct of tolylene diisocyanate, may be added into the magnetic paint. When adding the above low molecule polyisocyanate compound, a three-dimensional network structure is formed inwardly of the magnetic recording layer, and hence it becomes feasible to enhance a mechanical strength of the magnetic recording layer. Note that, it is preferable that the low molecule polycyanate compound is used at a rate of 10%–50% by weight to the binder resin.

Further, the magnetic paint may contain a variety of additives such as dispersant, lubricant, abrasive and anti-static agent.

It is preferable that dispersant containing a phosphoric acid ester group be employed as the above-mentioned dispersant.

The phosphoric acid ester group may be polyester phosphoric acid ester group, and polyoxyethylene alkylphenyl phosphoric acid ester group. The dispersant containing the phosphoric acid ester group may be phosphatidyl choline (lecitin) and RE-610 (made by Toho Chemical Co., Ltd.) and PW-36 (made by Kushumoto Chemical Industry Co., Ltd).

There may be used dispersant obtained by combining the dispersing agent containing the phosphoric acid ester group with fatty acid of carbon-12 to carbon-18 such as capric acid, lauric acid, myristic acid, oleic acid and linoleic acid, a metallic soap composed of alkali metal of this fatty acid or alkali earth metal salt, lecitin, and so on.

A quantity of addition of the dispersant to the magnetic paint is set so that the content in the magnetic recording layer normally falls within a range of 0.1%–10% by weight and particularly 1%–5% by weight.

Various kinds of lubricant such as aliphatic series, fluorine series, silicon series or hydrocarbon series are usable as lubricant.

The aliphatic series lubricant is classified into fatty acid, fatty acid metal salt, fatty acid ester, fatty acid amide, aliphatic alcohol and the like. The fatty acid lubricant may be oleic acid, lauric acid, myristic acid, palmitic acid, stearic acid, behenic acid etc and the like. Further, the fatty acid metal salt lubricating agent may include magnesium salt, aluminum salt, sodium salt and calcium salt etc of those fatty acids. Moreover, the fatty acid ester may include butylester, octylester or glyceride est of the above atty acids. As the fatty acid amide, there may be given, e.g., amide of the above fatty acid, linoleic acid amide and caproic acid amide etc. As the fatty acid alcohol, there may be, e.g., lauryl alcohol, myristyl alcohol, palmityl alcohol, stearyl alcohol and oleyl alcohol.

The fluorine series lubricant may include, e.g., perfluoro alkyl polyester and perfluoro alkyl carbon acid.

Silicon series lubricant may be silicon oil and denatured silicon oil. The hydrocarbon series lubricant may be, for example, paraffin, squalane and wax.

Further, solid-state lubricants such as molybdenum disulfide and tungsten disulfide, and ester phosphate etc may also be use as lubricant.

The lubricant is used so that the content in the magnetic recording layer is normally 0.1%–10% by weight and more preferably 1%–7% by weight. Incidentally, when the magnetic recording layer is manufactured in multi-layers laminated on each other, a quantity of the lubricant contained in the magnetic coating for each layer may also be varied.

As abrasive, there are solely or in combination of two or more kinds employed, e.g., α-alumina, β-alumina, γ-alumina, α-iron oxide, silicon nitride, boron nitride, titanium oxide, silicon dioxide, tin oxide, zinc oxide, calcium carbonate, calcium sulfate, barium sulfate, molybdenum disulfide, tungsten oxide, silicon carbide and chromium oxide. Concrete examples of abrasive may be AKP-20, AKP-30, AKP-50: HIT-50 and HIT-100 made by Sumitomo Chemical Co., Ltd., TF-100, TF-120 and TF-140 made by Toda Industry Co., ltd, FT-1000 and FT-2000 made by Ishihara Industry Co., Ltd., STT-4D, STT-30 and STT-65C made by Titan Industry Co., Ltd., and S-1, G5 and G7 made by Nippon Chemical Industry Co., Ltd.

Incidentally, it is preferable to use abrasive of a number average particle size of which is 0.5 μm or under. It is also preferable to use abrasive so that the content in the magnetic recording layer becomes 1%–10% by weight.

The antistatic agent may be natural surface activators such as carbon black, conductive metals, conductive compounds and saponin, nonionic surface activators such as alkylene oxide series and glycerine series, cation surface activators such as higher alkylamines, fourth-grade ammonium slats, pyridinium salts and other heterocyclic salts, anion surface activators containing acid groups such as carboxylic acid group, sulfone acid group, phosphoric acid group, sulphate ester group and phosphoric acid ester group, and ampholytic surface activators such as amino acids, amino sulfone acids, sulfuric acid or phosphoric acid esters of amino alcoho.

The carbon black may be such as acetylene black, black for color, furnace black and thermal black. As a concrete example, there may be BLACKPEARLS 2000, 1000, 900, 800 and VULCAN XC-72 made by Cabot Corp., RAVEN 8800, 8000 and 7000 made by Colombian Carbon Corp., #3750B, #3750, #3250B, #3250=#950, #850B, #650B, #45, #40, #5, MA-77 and MA-7 made by Mitsubishi Chemical Co., Ltd. These carbon blacks can be employed solely in one kind or in combination of two or more kinds. Further, the surface thereof may be treated with dispersant etc., or there may be used the carbon black some of which is graphitized.

Moreover, the conductive metal and the conductive compound may involve tin oxide, indium tin oxide and so on.

An usage of antistatic agent is preferably set so that the content in the magnetic recording layer normally falls within a range of 0.1%–10% by weight. Note that some of the antistatic agents might be employed for the purpose of enhancing the lubricating property.

As solvent, there may be used, e.g., ketones such as methylketone, methylisobutylketone and cyclohexanone, alcohols such as methanol, propanol and isopropyl alcohol, esters such as methyl acetate, ethyl acetate, butyl acetate, ethers such as diethylether and tetrahydrofuran, aromatic series hydrocarbons, and fatty hydrocarbons such as hexane.

Further, all the above-described carbon blacks employed for manufacturing magnetic paint are usable as paints for back coat layers. It is, however, desirable that a carbon black having a particle size of 50 nm–100 nm is used in order to make a surface roughness of the back coat layer appropriate. It is desirable to use a carbon black having a large structure, namely, having a dibutylphthalate (DBP) oil absorbing quantity of approximately 100 ml/100 g in order to make the surface thereof appropriate. Those carbon blacks may be used in such a manner that two or more kinds of carbon blacks are mixed to control the surface property in order to make the roughness of the surface of the back coat layer appropriate and to reduce the surface electric resistance.

As binding agent for the back coat layer, all of the various binder resins described above may be employed. Note that a mixing ratio of the binding agent to the carbon black is preferably 30%–200% by weight and more preferably 70%–150% by weight.

Further, all of the above-mentioned lubricant, dispersant, abrasive and antistatic agent used to form the magnetic recording layer can be used as additives.

Materials for constituting the flexible non-magnetic support of the magnetic recording tape according to the present invention may be, e.g., polyester groups such as polyethylene terephthalate (PET), polyethylene-2 and 6-naphthalate, polyolefins such as polypropylene, cellulose derivatives such as cellulose triacetate and cellulose diacetate, and plastics such as aramide and polycarbonate.

There is no particular restrain of thickness of the flexible non-magnetic support. According to the present invention, however, it is feasible to obtain the magnetic recording tape in which a winding deviation hardly occurs though using the non-magnetic support having a thickness of 5 $\mu$m or under enough to easily cause the winding deviation because of a smaller rigidity of the tape.

Note that this non-magnetic support may be subjected to a corona discharge treatment and a surface treatment by a surface modifier such as amine aqueous solution, trichloroacetic acid and a phenol group to improve the adhesion with the magnetic recording layer.

As a method of coating the magnetic paint to form the magnetic recording layer on the flexible non-magnetic support, it is available to use air doctor coating, blade coating, air knife coating, squeeze coating, impregnation coating, reverse roll coating, gravure coating and spray coating. After the magnetic paint has been coated over the support by one of those methods, an orientation treatment of the magnetic powder in the magnetic recording layer is executed if necessary. Thereafter, a drying treatment is performed. Next, if necessary for setting Ra to 10 nm or under, a surface smoothing treatment (hereinafter referred to as a "calender treatment").

The back coat layer is also subjected to the same drying treatment as that on the magnetic recording layer, and also to the calender treatment if required for setting Ra to 100 nm–300 nm.

Incidentally, when executing the calender treatment, the condition therefor is determined based on the paint composite and the surface property after being dried so as to obtain Ra desired.

The method of manufacturing the magnetic recording tape used for the belt driven tape cartridge according to the present invention will hereinafter be described more specifically. The magnetic recording tape assuming the surface property prescribed according to the present invention, can be manufactured as follows.

First, as the magnetic powder, metal magnetic powder is used, wherein as $\sigma s=135$ emu/g, Hc=1900 Oe, BET specific area=55 m$^2$/g, and the major axis length=0.08 $\mu$m. Then, the magnetic paint of the following mixture is prepared.

| Magnetic Paint Blending for Magnetic Recording Layer (Weight Part) | |
|---|---|
| Metal magnetic powder | 100 |
| Vinyl chloride vinyl acetate vinyl alcohol copolymer (polymerization degree 400) | 10 |
| Polyurethane resin (molecular weight 40000) | 10 |
| Alumina (AKP50) | 8 |
| Carbon black (particle size: 23 nm, DBP oil absorption: 65 ml/100 g) | 8 |
| Butyl stearate | 2 |
| Myristic acid | 2 |
| Methyl ethyl ketone | 200 |
| Toluene | 100 |

Further, a back coat layer coating A is blended as follows.

| Back Coat Layer Paint A Blend (Weight Part) | |
|---|---|
| Carbon black (particle size: 40 nm, DBP oil absorption: 500 ml/100 g) | 100 |
| Additive agent | 20 |
| Vinyl chloride vinyl acetate vinyl alcohol copolymer (polymerization degree 400) | 20 |
| Polyurethane resin (molecular weight 40000) | 80 |
| Myristic acid | 2 |
| Methyl ethyl ketone | 300 |
| Toluene | 100 |

Then, after the above magnetic paint has been coated over one surface of a PET film, the orientating and drying treatments are carried out, and the smoothing treatment is executed at a calendering temperature of 90° C. Subsequently, the back coat layer paint A is coated over the other surface of the PET film, and is dried. Thereafter, the PET film is cut to a width of ¼ inch, thereby obtaining the magnetic recording tape.

According to the procedures as above described, it is possible to manufacture the magnetic recording tape in which Ra of the magnetic layer is under 10 nm, Ra of the back coat layer falls within a range of 100 nm–300 nm. Then, the belt driven tape cartridge produced by use of the manufactured magnetic recording tape is hard to cause a pack shift and print-through and exhibits the enhanced C/N.

More specifically, the belt driven tape cartridge produced by using the magnetic recording tape manufactured as described above has the characteristics shown by examples 1–3 in Table 1. Note that Table 1 shows also evaluation results (Examples 4–10) of the belt driven tape cartridge using the magnetic recording tape manufactured intentionally so as not to assume the surface property prescribed according to the present invention by changing the back coat layer paint and the calender condition.

Further, referring to Table 1, the values Ra of the magnetic recording layer and of the back coat layer are central average surface roughnesses obtained when the respective surfaces are measured with the aid of a 40-powered lens by using a three-dimensional non-contact surface roughness meter "NewView100" made by ZYGO Corp.

The symbols shown in the pack shift column and the print-through column indicate the number of tapes having winding deviations (the pack shifts) and the number of tapes having transfers, when a reading/writing test over the entire length of the magnetic recording tape is performed 5000 times by "JUMBO700" made by Colorado Memory Corp. with respect to 100 sets of magnetic tape cartridges assembled by use of a variety of magnetic recording tapes manufactured in a manner that the surface properties are different. To be specific, the symbol ⊙ shown in the pack shift column connotes that "there is no cartridge with the occurrence of the pack shift", and the symbol o connotes that "there is one cartridge with the occurrence of the pack shift among the 100 cartridges". Further, the symbols ⊙, o, x shown in the print-through column connote respectively that "there is no cartridge with the occurrence of the print-through", that "there are two or less cartridges with the occurrence of the print-through among the 100 cartridges", and that "there are three or more cartridges with the occurrence of the print-through among the 100 cartridges". Further, the C/N column shows the results (o: Equal or more as compared with the standard cartridge prescribed in the QIC Committee. x: Inferior as compared with the standard cartridge prescribed by the QIC Committee) when C/N is measured with a recording density 22200FCI by use of the same drive.

As shown in Table 1, the magnetic recording tape (the examples 1–3) manufactured under the above described condition has Ra prescribed according to the present invention regardless of the thickness of the PET film. Therefore, the belt driven tape cartridge produced by employing the above-described magnetic recording tape is hard to cause the pack shift and the print-through as well and exhibits the enhanced C/N. Further, the PET film having the thickness of 4.5 μm can be used, and hence it is possible to carry out the belt driven tape cartridge (the example 2) having a winding length as long as 1500 feet.

In contrast with this, when using the magnetic recording tape manufactured so that Ra of the magnetic layer or the back coat layer deviates from the range prescribed according to the present invention, a belt driven tape cartridge may have a problem in terms of any one of the pack shift, the C/N and the print-through. For instance, when the back coat layer is subjected to the calender treatment, and if Ra of the back coat layer is less than 100 (examples 5 and 9), the winding deviation occurs when manufacturing the cartridge. Further, in the case of employing the magnetic recording tape manufactured so that Ra of the magnetic recording layer exceeds 10 by setting a calender treatment temperature of the magnetic recording layer at 70° C. (the examples 4, 7 and 8), the C/N declines. Moreover, in the case of using the magnetic recording tape manufactured so that Ra of the back coat layer exceeds 300 by use of the back coat layer B containing not the above carbon black but a carbon black of which the particle size is 75 nm and the DBP oil absorption is 70 ml/100 g (the examples 6, 7 and 10), the belt driven tape cartridge in which the print-through is easy to occur might be produced.

Namely, it is required that Ra of the magnetic layer is 10 nm or under in order to obtain an enhanced C/N. It is also required that Ra of the back coat layer is 100 nm or above in order not to cause the pack shift. Further, Ra of the back coat layer is required to be 300 nm or less in order not to cause the print-through.

Therefore, when using the magnetic recording tape having the surface property prescribed according to the present invention, it is feasible to obtain the excellent belt driven tape cartridge exhibiting the enhanced C/N, having no influence of the surface configuration of the back coat layer upon the magnetic recording layer and causing no pack shift.

It is apparent that, in this invention, a wide range of different working modes can be formed based on the invention without deviating from the spirit and scope of the invention. This invention is not restricted by its specific working modes except being limited by the appended claims.

TABLE 1

| EXAMPLE | PET FILM THICKNESS (μm) | PAINT FOR BACK COAT LAYER | SMOOTHING TREATMENT TEMPERATURE (° C.)/OBJECT | TAPE LENGTH (feet) | SURFACE ROUGHNESS Ra (nm) MAGNETIC RECORDING LAYER | SURFACE ROUGHNESS Ra (nm) BACK COAT LAYER | PACK SHIFT | C/N | TRANS-FER |
|---|---|---|---|---|---|---|---|---|---|
| PRESENT INVENTION | | | | | | | | | |
| 1 | 4.5 | A | 90/MAGNETIC RECORDING LAYER | 1000 | 9 | 210 | ⊙ | o | o |
| 2 | 4.5 | A | 90/MAGNETIC RECORDING LAYER | 1500 | 9 | 210 | o | o | o |
| 3 | 6.5 | A | 90/MAGNETIC RECORDING LAYER | 1000 | 9 | 205 | o | o | ⊙ |
| COMPARATIVE EXAMPLE | | | | | | | | | |
| 4 | 4.5 | A | 70/MAGNETIC RECORDING LAYER | 1000 | 15 | 210 | ⊙ | X | o |

TABLE 1-continued

| EXAMPLE | PET FILM THICKNESS (μm) | PAINT FOR BACK COAT LAYER | SMOOTHING TREATMENT TEMPERATURE (° C.)/OBJECT | TAPE LENGTH (feet) | SURFACE ROUGHNESS Ra (nm) MAGNETIC RECORDING LAYER | SURFACE ROUGHNESS Ra (nm) BACK COAT LAYER | PACK SHIFT | C/N | TRANSFER |
|---|---|---|---|---|---|---|---|---|---|
| 5 | 4.5 | A | 90/MAGNETIC RECORDING LAYER AND BACK COAT LAYER | 1000 | 9 | 90 | IMPOSSIBLE OF BEING INCORPORATED INTO CARTRIDGE | | |
| 6 | 4.5 | B | 90/MAGNETIC RECORDING LAYER | 1000 | 9 | 350 | ⊚ | ○ | X |
| 7 | 4.5 | B | 70/MAGNETIC RECORDING LAYER | 1000 | 15 | 350 | ⊚ | X | X |
| 8 | 6.5 | A | 70/MAGNETIC RECORDING LAYER | 1000 | 14 | 205 | ⊚ | X | ○ |
| 9 | 6.5 | A | 90/MAGNETIC RECORDING LAYER AND BACK COAT LAYER | 1000 | 8 | 90 | IMPOSSIBLE OF BEING INCORPORATED INTO CARTRIDGE | | |
| 10 | 6.5 | B | 90/MAGNETIC RECORDING LAYER | 1000 | 8 | 340 | ⊚ | ○ | X |

What is claimed is:

1. A belt driven tape cartridge comprising:

a box body;

a magnetic recording tape including a flexible non-magnetic support, a magnetic recording layer formed on one surface of said flexible support and having a surface roughness being 10 nm or under, and a back coat layer formed on other surface of said flexible support and having a surface roughness being not less than 100 nm but not more than 300 nm;

a pair of tape reel hubs, provided within said box body, for winding up and accommodating said magnetic recording tape;

magnetic recording tape guide members for determining a path for said magnetic recording tape between said pair of tape reel hubs so that said magnetic recording tape passes near a front surface of said box body; and drive belt holding members for holding a drive belt within said box body in a state that the drive belt is perpetually kept in pressure-contact with said magnetic recording tape wound on both of said pair of tape reel hubs and is capable of being driven from the front surface of said box body.

2. A belt driven tape cartridge according to claim 1, wherein a thickness of said flexible non-magnetic support of said magnetic recording tape is 5 μm or under.

3. A belt driven tape cartridge according to claim 1, wherein said magnetic recording layer of said magnetic recording tape contains a metal magnetic powder of which a saturation magnetization is 120 emu/g or above, a coercive force is 1600 Oe or above, and a specific surface area is 50 $m^2/g$ or above.

4. A belt driven tape cartridge according to claim 1, wherein distances of rotary spindles of said pair of tape reel hubs from the front surface of said box body are different.

* * * * *